US012677085B2

(12) United States Patent
Otsuki

(10) Patent No.: US 12,677,085 B2
(45) Date of Patent: Jul. 7, 2026

(54) PROJECTOR ENABLING IMAGE VIEWING WITH A HIGH SOUND QUALITY IN A BROAD RANGE

(71) Applicant: SEIKO EPSON CORPORATION, Tokyo (JP)

(72) Inventor: Nobuyuki Otsuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 252 days.

(21) Appl. No.: 18/646,977

(22) Filed: Apr. 26, 2024

(65) Prior Publication Data

US 2024/0365035 A1 Oct. 31, 2024

(30) Foreign Application Priority Data

Apr. 28, 2023 (JP) ................................. 2023-074635

(51) Int. Cl.
| | |
|---|---|
| *H04R 1/02* | (2006.01) |
| *H04N 9/31* | (2006.01) |
| *H04R 5/02* | (2006.01) |

(52) U.S. Cl.
CPC ........... *H04R 1/025* (2013.01); *H04N 9/3141* (2013.01); *H04R 5/02* (2013.01); *H04R 2499/15* (2013.01)

(58) Field of Classification Search
CPC ...... H04R 1/025; H04R 5/02; H04R 2499/15; H04N 9/3141
See application file for complete search history.

(56) References Cited

U.S. PATENT DOCUMENTS

| | | | |
|---|---|---|---|
| 2005/0129263 A1 | 6/2005 | Tamura et al. | |
| 2006/0092384 A1* | 5/2006 | Kuroda | G03B 21/145 |
| | | | 353/69 |
| 2009/0168024 A1* | 7/2009 | Hayashi | H04R 1/2834 |
| | | | 353/15 |
| 2012/0008095 A1* | 1/2012 | Sakashita | H04R 1/2896 |
| | | | 353/15 |
| 2019/0182582 A1* | 6/2019 | Huang | H04R 1/028 |
| 2022/0004088 A1 | 1/2022 | Tanaka et al. | |
| 2022/0303670 A1 | 9/2022 | Otsuki | |

FOREIGN PATENT DOCUMENTS

| | | |
|---|---|---|
| JP | 2021-180470 A | 11/2021 |
| JP | 2022-012675 A | 1/2022 |
| JP | 2022-143004 A | 10/2022 |
| WO | WO 2003/079718 A | 9/2003 |

* cited by examiner

*Primary Examiner* — Andrew Sniezek
(74) *Attorney, Agent, or Firm* — Dority & Manning, P.A.

(57) ABSTRACT

A projector includes a housing having a first wall part facing a projection target surface, a second wall part facing an opposite side to the first wall part, a third wall part and a fourth wall part facing respective sides opposite to each other, a first speaker disposed in a first corner part of the housing, and a second speaker disposed in a second corner part of the housing, wherein a first output surface for outputting a sound wave in the first speaker tilts toward the third wall part in an angle range larger than 45 degrees and smaller than 90 degrees with reference to the second wall part, and a second output surface for outputting a sound wave in the second speaker tilts toward the fourth wall part in an angle range larger than 45 degrees and smaller than 90 degrees with reference to the second wall part.

15 Claims, 6 Drawing Sheets

PROJECTOR ENABLING IMAGE VIEWING WITH A HIGH SOUND QUALITY IN A BROAD RANGE

The present application is based on, and claims priority from JP Application Serial Number 2023-074635, filed Apr. 28, 2023, the disclosure of which is hereby incorporated by reference herein in its entirety.

BACKGROUND

1. Technical Field

The present disclosure relates to a projector.

2. Related Art

In the past, there has been known a projector having speakers disposed in an exterior housing (see, e.g., JP-A-2022-143004, JP-A-2022-12675). In the projector described above, the speakers are disposed on right and left corners at a back side opposite to a front side on which an image is projected. In the projector described above, an output surface of a sound of the speaker is tilted within 45 degrees toward a lateral side with reference to the back side.

In general, the projector is disposed at a position at a predetermined distance from a screen surface. When the output surface of the sound of the speaker is disposed within 45 degrees toward the lateral side with reference to the back side as described above, it is possible to obtain high sound quality in an area at the back side where the sounds from the right and left speakers overlap each other in a front-back direction of the front side and the back side of the projector. On the other hand, at the front side, the sound is difficult to propagate compared to the back side, and it is difficult to obtain the high sound quality. Therefore, when viewing an image giving greater importance to the sound quality, a viewing audience is required to be located at the back side of the projector, and therefore, there is a problem that the use of the space in which the projector is used is limited, and in particular, when a large screen is projected in a small space, the problem becomes more conspicuous.

JP-A-2022-143004, JP-A-2022-12675 are example of the related art.

SUMMARY

In view of the problems described above, according to an aspect of the present disclosure, there is provided a projector including an exterior housing having a first wall part facing a projection target surface on which an image is projected, a second wall part facing an opposite side to the first wall part in a direction along a first axis, a third wall part and a fourth wall part facing respective sides opposite to each other in a direction along a second axis perpendicular to the first axis, and a fifth wall part and a sixth wall part facing respective sides opposite to each other in a direction along a third axis perpendicular to the first axis and the second axis, a first speaker disposed in a first corner part configured with the second wall part and the third wall part in an inside of the exterior housing, and a second speaker disposed in a second corner part configured with the second wall part and the fourth wall part in the inside of the exterior housing, wherein a first output surface configured to output a sound wave in the first speaker tilts toward the third wall part in an angle range larger than 45 degrees and smaller than 90 degrees with reference to the second wall part, and a second output surface configured to output a sound wave in the second speaker tilts toward the fourth wall part in an angle range larger than 45 degrees and smaller than 90 degrees with reference to the second wall part.

BRIEF DESCRIPTION OF THE DRAWINGS

FIG. 4 is a diagram showing an acoustic field environment which the projector forms on the periphery.

FIG. 5 is a configuration diagram of an essential part of a projector according to a first modified example.

DESCRIPTION OF EMBODIMENTS

An embodiment of the present disclosure will hereinafter be described in detail with reference to the drawings. It should be noted that the drawings used in the following description show characteristic parts in an enlarged manner in some cases for the sake of convenience in order to make the features easy to understand, and the dimensional ratios between the elements and so on are not necessarily the same as actual ones.

Figure 1:
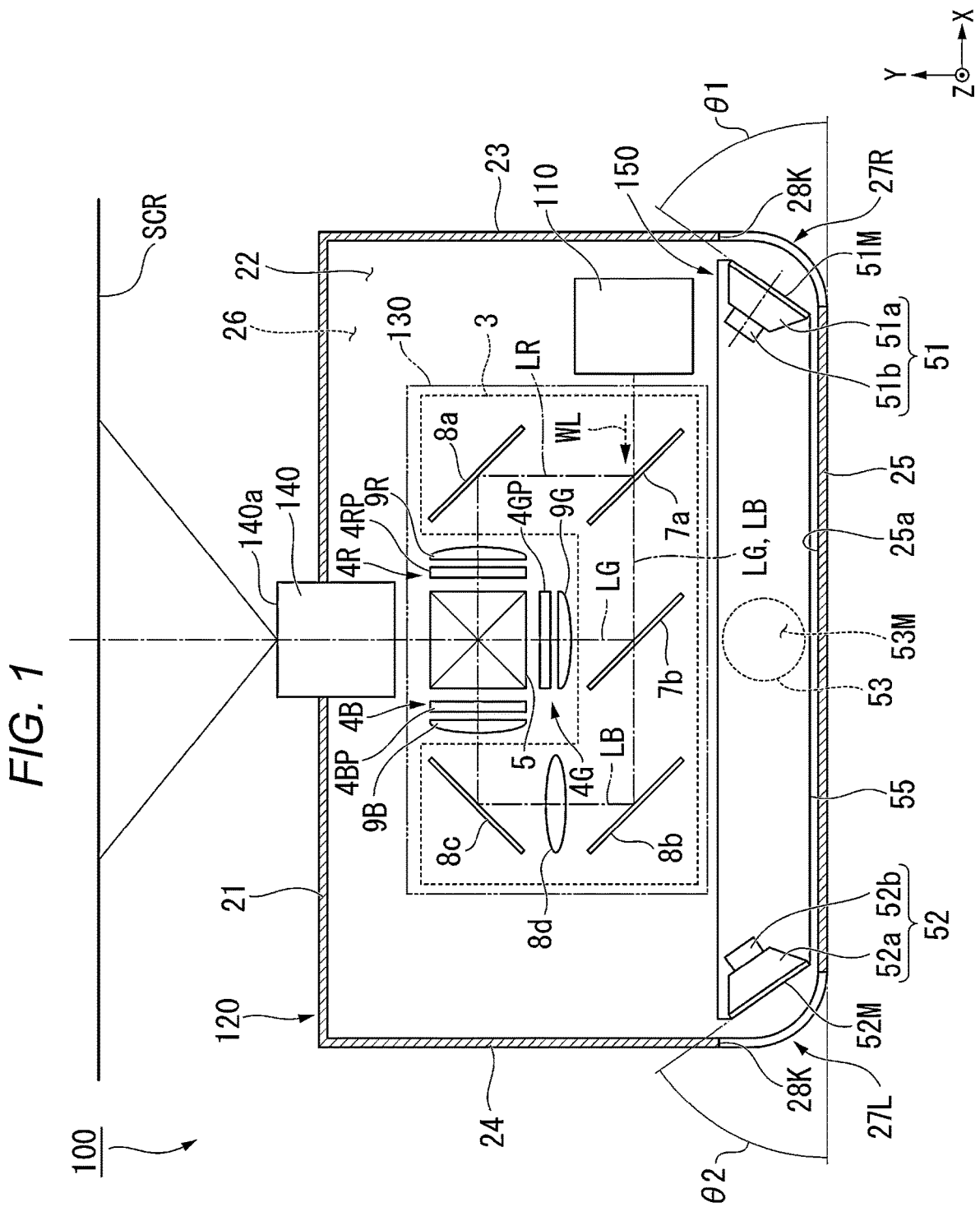
FIG. 1 is a schematic configuration diagram of a projector according to an embodiment.

FIG. 1 is a schematic configuration diagram of a projector 100 according to the present embodiment.

As shown in FIG. 1, the projector 100 according to the present embodiment is provided with an illumination unit 110, an exterior housing 120, an image forming unit 130, a projection optical device 140, and a speaker device 150.

A layout relationship between members is hereinafter described using an X-Y-Z coordinate system shown in the drawings in some cases. In each of the drawings, a Y axis is an axis extending along a direction in which the projector 100 projects an image. An X axis is an axis perpendicular to the Y axis, and is an axis extending along a width direction of a screen as a projection target surface on which the image is projected. A Z axis is an axis which is perpendicular to the X axis and the Y axis, and extends along a normal line of an installation surface on which the projector 100 is provided.

In the present embodiment, for example, both directions along the Z axis are collectively referred to as a "vertical direction Z" in the projector 100, a direction toward the +Z direction is referred to as an "upper side," and a direction toward the −Z direction is referred to as a "lower side." Further, both directions along the X axis are collectively referred to as a "horizontal direction X" in the projector 100, a direction toward the +X direction is referred to as a "right side," and a direction toward the −X direction is referred to as a "left side." Further, both directions along the Y axis are collectively referred to as a "front-back direction Y" in the projector 100, a direction toward the +Y direction is referred to as a "front side," and a direction toward the −Y direction is referred to as a "back side."

In the present embodiment, the Y axis, the X axis, and the Z axis correspond to a "first axis," a "second axis," and a "third axis," respectively. It should be noted that the vertical direction Z, the front-back direction Y, and the horizontal direction X are mere denotations for describing layout relationships between elements of the projector 100, but are not ones for defining actual installation postures and orientations in the projector 100.

The exterior housing 120 is a member which has a substantially rectangular solid shape, and which is shaped like a hollow box. The exterior housing 120 incorporates the illumination unit 110, the image forming unit 130, the projection optical device 140, and the speaker device 150.

The exterior housing 120 has a front side wall part 21, a top wall part 22, a right side wall part 23, a left side wall part 24, a rear side wall part 25, and a bottom wall part 26. In the exterior housing 120, the front side wall part 21 is a plate member located at the +Y direction side as a front side in the front-back direction Y, the top wall part 22 is a plate member located at the +Z direction side as an upper side in the vertical direction Z, the right side wall part 23 is a plate member located at the +X direction side as a right side in the horizontal direction X, the left side wall part 24 is a plate member located at the −X direction side as a left side in the horizontal direction X, the rear side wall part 25 is a plate member located at the −Y direction side as a rear side in the front-back direction Y, and the bottom wall part 26 is a plate member located at the −Z direction side as a lower side in the vertical direction Z.

In the exterior housing 120 in the present embodiment, the front side wall part 21 corresponds to a "first wall part," the rear side wall part 25 corresponds to a "second wall part," the right side wall part 23 corresponds to a "third wall part," the left side wall part 24 corresponds to a "fourth wall part," the top wall part 22 corresponds to a "fifth wall part," and the bottom wall part 26 corresponds to a "sixth wall part."

The front side wall part 21 is a wall part facing the screen SCR as the projection target surface on which the image is projected from the projector 100. The front side wall part 21 and the rear side wall part 25 are disposed in parallel to the X-Z plane so as to be opposed to each other. The rear side wall part 25 faces an opposite side to the front side wall part 21 in the front-back direction Y along the Y axis.

The right side wall part 23 and the left side wall part 24 are disposed in parallel to the Y-Z plane so as to be opposed to each other. The right side wall part 23 and the left side wall part 24 face respective sides opposite to each other in the horizontal direction X along the X axis perpendicular to the Y axis.

The top wall part 22 and the bottom wall part 26 are disposed in parallel to the X-Y plane so as to be opposed to each other. The top wall part 22 and the bottom wall part 26 face respective sides opposite to each other in the vertical direction Z along the Z axis perpendicular to the X axis and the Y axis.

The projector 100 according to the present embodiment is assumed to be provided in a state in which the bottom wall part 26 of the exterior housing 120 is opposed to a projector installation surface such as a top surface of a table. Specifically, the top wall part 22 is located at an opposite side to the bottom wall part 26 opposed to the projector installation surface.

The front side wall part 21 is disposed to cross, specifically be perpendicular to, the right side wall part 23, the left side wall part 24, and the top wall part 22. The front side wall part 21 is disposed to cross, specifically be perpendicular to, the right side wall part 23, the left side wall part 24, and the bottom wall part 26.

The exterior housing 120 has a right rear side corner part 27R configured with the rear side wall part 25 and the right side wall part 23, and a left rear side corner part 27L configured with the rear side wall part 25 and the left side wall part 24. In the present embodiment, the right rear side corner part 27R corresponds to a "first corner part," and the left rear side corner part 27L corresponds to a "second corner part."

Although not shown in the drawings, the illumination unit 110 has, for example, a laser source and a wavelength conversion element. The illumination unit 110 collects a blue laser beam emitted from the laser source as excitation light with a collecting lens to make the result enter the wavelength conversion element including a phosphor, and then emits white light including the blue laser beam and yellow fluorescence. It should be noted that the illumination unit 110 is not limited to the configuration using the laser source and the wavelength conversion element, but it is possible to apply, for example, a configuration using a laser source alone, or a configuration using an LED (Light Emitting Diode) or a discharge type light source lamp. Further, it is possible for the illumination unit 110 to have a radiation member such as a heatsink for releasing the heat generated in a light emitting source to the outside.

The image forming unit 130 has a color separation optical system 3, light modulation devices 4R, 4G, and 4B, and a light combining optical system 5. The image forming unit 130 generates image light from light emitted from the illumination unit 110.

The color separation optical system 3 separates the white light WL emitted from the illumination unit 110 into red light LR, green light LG, and blue light LB. The color separation optical system 3 is provided with a first dichroic mirror 7a, a second dichroic mirror 7b, a first reflecting mirror 8a, a second reflecting mirror 8b, a third reflecting mirror 8c, and a relay lens 8d.

The first dichroic mirror 7a separates the white light WL emitted from the illumination unit 110 into the red light LR, and the light including the green light LG and the blue light LB mixed with each other. The first dichroic mirror 7a reflects the red light LR, and at the same time, transmits the green light LG and the blue light LB. The second dichroic mirror 7b separates light including the green light LG and the blue light LB mixed with each other into the green light LG and the blue light LB. The second dichroic mirror 7b reflects the green light LG, and at the same time, transmits the blue light LB.

The first reflecting mirror 8a is disposed in a light path of the red light LR. The first reflecting mirror 8a reflects the red light LR, which is reflected by the first dichroic mirror 7a, toward the light modulation device 4R. The second reflecting mirror 8b and the third reflecting mirror 8c are disposed in the light path of the blue light LB. The second reflecting mirror 8b and the third reflecting mirror 8c guide the blue light LB, which is transmitted through the second dichroic mirror 7b, to the light modulation device 4B.

The light modulation device 4R is configured with a liquid crystal panel 4RP and polarization plates not shown respectively disposed at an incident side and an exit side of the liquid crystal panel 4RP. The light modulation device 4G is configured with a liquid crystal panel 4GP and polarization plates not shown respectively disposed at an incident side and an exit side of the liquid crystal panel 4GP. The light modulation device 4B is configured with a liquid crystal panel 4BP and polarization plates not shown respectively disposed at an incident side and an exit side of the liquid crystal panel 4BP. The light modulation device 4R modulates the red light LR in accordance with an image signal. The light modulation device 4G modulates the green light LG in accordance with the image signal. The light modulation device 4B modulates the blue light LB in accordance with the image signal. Thus, the light modulation devices 4R, 4G, and 4B each form the image light corresponding to the colored light.

At the light incident side of the light modulation device 4R, a field lens 9R for collimating the red light LR entering the light modulation device 4R is disposed. At the light incident side of the light modulation device 4G, a field lens 9G for collimating the green light LG entering the light modulation device 4G is disposed. At the light incident side of the light modulation device 4B, there is disposed a field lens 9B for collimating the blue light LB entering the light modulation device 4B.

The color combining optical system 5 is formed of a cross dichroic prism having a substantially cubic shape. The light combining optical system 5 combines the image light of the respective colors from the respective light modulation devices 4R, 4G, and 4B with each other. The light combining optical system 5 emits the image light thus combined toward the projection optical device 140.

The projection optical system 140 projects the image light emitted from the image forming unit 130 toward the screen SCR in an enlarged manner. By projecting the light from the projection optical device 140, a color image thus enlarged is displayed on the screen SCR. The projection optical device 140 has a light emitting unit 140a which includes a plurality of projection lenses not shown, and which emits the light. It should be noted that the number of the projection lenses configuring the projection optical device 140 is not limited.

In the case of the present embodiment, the light emitting unit 140a of the projection optical device 140 is disposed in the front side wall part 21 of the exterior housing 120. In the present embodiment, a tip surface of the light emitting unit 140a of the projection optical device 140 protrudes from a surface of the front side wall part 21 of the exterior housing 120, but can also be located on the same plane as, or at an inner side of, the surface of the front side wall part 21 of the exterior housing 120.

The projection optical device 140 in the projector 100 according to the present embodiment is formed of a projection lens having a general focal distance. Therefore, the projector 100 according to the present embodiment is provided at a predetermined distance from the screen SCR as described above, and at the same time, in front of the viewing audience which views the image.

A throw ratio in the projector 100 according to the present embodiment is set in a range of 0.7 through 1.3, and is more preferably set in a range of 1.0 through 1.3. Here, the throw ratio means a ratio between a distance from the projection optical device 140 to the screen SCR and a lateral width in the horizontal direction X along the X axis of the image projected on the screen SCR. When the projection distance of the projector shortens, the throw ratio lowers. The projector 100 according to the present embodiment is capable of realizing a good acoustic space in the projector of a type of projecting an image from a position at a certain distance from the screen SCR. It should be noted that, for example, the throw ratio of the projector 100 can be changed by, for example, replacing the projection optical device 140 with another device different in focal distance.

The speaker device 150 is disposed along an inner surface of the rear side wall part 25 of the exterior housing 120. The speaker device 150 has a first speaker 51, a second speaker 52, a third speaker 53, and a speaker housing 55.

The first speaker 51 is a full-range speaker for emitting an audible frequency range from a low pitch sound to a high pitch sound. It should be noted that a middle/high-tone range speaker for emitting a middle/high pitch sound no lower than, for example, 300 Hz can be adopted instead of the full-range speaker.

The first speaker 51 has a diaphragm 51a and a yoke 51b. The diaphragm 51a includes a first output surface 51M for outputting a sound wave with its own vibration. The yoke 51b constitutes a part of a magnetic circuit, and at the same time, functions as a base member for supporting the whole of the first speaker 51. The first speaker 51 has a voice coil, a magnet, and so on besides the elements described above, but these are common elements, and therefore, the description thereof will be omitted.

The second speaker 52 is a full-range speaker for emitting an audible frequency range from a low pitch sound to a high pitch sound. It should be noted that a middle/high-tone range speaker for emitting a middle/high pitch sound no lower than, for example, 300 Hz can be adopted instead of the full-range speaker. The second speaker 52 has substantially the same configuration as that of the first speaker 51, and therefore, the description of the details of the configuration of the second speaker 52 will be omitted. The second speaker 52 has the diaphragm and the yoke, and includes a second output surface 52M for outputting a sound wave.

The third speaker 53 is a bass speaker for emitting a bass sound wave lower than those of the first speaker 51 and the second speaker 52. The third speaker 53 is disposed between the first speaker 51 and the second speaker 52 in the horizontal direction along the X axis. The third speaker 53 in the present embodiment is formed of a passive radiator. Unlike the first speaker 51 and the second speaker 52, the third speaker 53 formed of the passive radiator has only the diaphragm, but does not have the magnetic circuit. The third speaker 53 includes a third output surface 53M for outputting a sound wave.

The speaker housing 55 supports the first speaker 51, the second speaker 52, and the third speaker 53. The speaker housing 55 covers back surfaces of the first speaker 51 and the second speaker 52 to thereby function as an enclosure for improving the sound quality. An inside of the speaker housing 55 is made to be an enclosed space. Therefore, the third speaker 53 effectively functions as the bass speaker without having the magnetic circuit by vibrating in response to an air vibration generated inside the speaker housing 55 when the first speaker 51 and the second speaker 52 operate.

The first speaker 51 is disposed in the exterior housing 120 so as to make the first output surface 51M face a predetermined direction. Similarly, the second speaker 52 is disposed in the exterior housing 120 so as to make the second output surface 52M face a predetermined direction.

In the speaker device 150 in the present embodiment, the first speaker 51 is disposed in the right rear side corner part 27R in the inside of the exterior housing 120, and the second speaker 52 is disposed in the left rear side corner part 27L in the inside of the exterior housing 120. The first speaker 51 and the second speaker 52 are disposed in a state in which the first output surface 51M and the second output surface 52M are each tilted by a predetermined angle with respect to the rear side wall part 25.

It is desirable for the first output surface 51M of the first speaker 51 to be tilted in an angle range larger than 45 degrees and smaller than 90 degrees taking the right side wall part 23 side, namely a central side of the rear side wall part 25 in the horizontal direction X, as an axis with reference to an outer surface 25a of the rear side wall part 25. Here, an angle between the first output surface 51M and the outer surface 25a of the rear side wall part 25 is defined as θ1. On this occasion, in other words, the first speaker 51 is disposed in the right rear side corner part 27R in the inside of the exterior housing 120 so as to fulfill a relationship of 45°<θ1<90°.

It is more desirable first output surface 51M of the first speaker 51 to be tilted in an angle range larger than 50 degrees and smaller than 70 degrees taking the right side wall part 23 side, namely the central side of the rear side wall part 25 in the horizontal direction X, as an axis with reference to the outer surface 25a of the rear side wall part 25. In other words, it is more desirable to dispose the first speaker 51 in the right rear side corner part 27R so as to fulfill a relationship of 50°<θ1<70°.

In the case of the present embodiment, the first output surface 51M of the first speaker 51 is tilted at 60 degrees taking the right side wall part 23 side, namely the central side of the rear side wall part 25 in the horizontal direction X, as an axis with reference to the outer surface 25a of the rear side wall part 25. In other words, the first speaker 51 is disposed in the right rear side corner part 27R in the inside of the exterior housing 120 so as to fulfill a relationship of θ1=60°.

Further, it is desirable for the second output surface 52M of the second speaker 52 to be tilted in an angle range larger than 45 degrees and smaller than 90 degrees taking the left side wall part 24 side, namely a central side of the rear side wall part 25 in the horizontal direction X, as an axis with reference to the outer surface 25a of the rear side wall part 25. Here, an angle between the second output surface 52M and the outer surface 25a of the rear side wall part 25 is defined as θ2. In this case, in other words, the second speaker 52 is disposed in the left rear side corner part 27L in the inside of the exterior housing 120 so as to fulfill a relationship of 45°<θ2<90°.

It is more desirable for the second output surface 52M of the second speaker 52 to be tilted in an angle range larger than 50 degrees and smaller than 70 degrees taking the left side wall part 24 side, namely the central side of the rear side wall part 25 in the horizontal direction X, as an axis with reference to the outer surface 25a of the rear side wall part 25. In other words, it is more desirable to arrange the second speaker 52 in the left rear side corner part 27L so as to fulfill a relationship of 50°<θ2<70°.

In the case of the present embodiment, the second output surface 52M of the second speaker 52 is tilted at 60 degrees taking the left side wall part 24 side, namely the central side of the rear side wall part 25 in the horizontal direction X, as an axis with reference to the outer surface 25a of the rear side wall part 25. In other words, the second speaker 52 is disposed in the left rear side corner part 27L in the inside of the exterior housing 120 so as to fulfill the relationship of θ2=60°.

In other words, in the case of the present embodiment, the first speaker 51 and the second speaker 52 are the same in tilt angle with respect to the outer surface 25a of the rear side wall part 25 as each other. According to this configuration, since the sound of each of the speakers 51, 52 spreads in a balanced manner in the horizontal direction X toward the rear side of the projector 100, it is possible to form a homogenous acoustic field environment.

In the projector 100 according to the present embodiment, an opening 28K is formed in each of the right rear side corner part 27R opposed to the first output surface 51M of the first speaker 51 and the left rear side corner part 27L opposed to the second output surface 52M of the second speaker 52. In other words, the openings 28K are formed respectively in the rear side wall part 25 and the right side wall part 23 configuring the right rear side corner part 27R, and in the rear side wall part 25 and the left side wall part 24 forming the left rear side corner part 27L.

According to the projector 100 related to the present embodiment, it is possible to allow the viewing audience to listen to the sounds emitted from the first speaker 51 and the second speaker 52 via the openings 28K provided to the exterior housing 120.

In the speaker device 150 in the present embodiment, the third speaker 53 is disposed so that the third output surface 53M faces the bottom wall part 26.

Here, a bass sound emitted from the third speaker 53 is lower in directionality compared to a middle/high pitch sound emitted from the first speaker 51 and the second speaker 52. Therefore, the bass sound emitted from the third output surface 53M of the third speaker 53 is reflected in the exterior housing 120 toward all directions to thereby be emitted to the outside through the openings 28K to carry to the ears of the viewing audience. Therefore, the third speaker 53 is less in restrictions of the installation place in the inside of the exterior housing 120 compared to the first speaker 51 and the second speaker 52.

It should be noted that it is possible to dispose that an opening is formed in the bottom wall part 26 opposed to the third output surface 53M of the third speaker 53 to take out the bass sound emitted from the third output surface 53M to the outside of the exterior housing 120 through the opening of the bottom wall part 26. It should be noted that since the bass sound emitted from the third output surface 53M of the third speaker 53 is emitted toward all directions, the opening in the bottom wall part 26 is not a limitation. It is possible to form the opening in the rear side wall part 25 or other wall parts instead of the bottom wall part 26. Since the third speaker 53 is disposed at the rear side wall part 25, it is possible to form the opening in any of the rear side wall part 25, the right side wall part 23, and the left side wall part 24. The place where the opening is formed is not limited to one of the wall parts, and it is possible to form the openings in two or more wall pars such as both of the bottom wall part 26 and the rear side wall part 25, and it is preferable to evenly form the openings in all directions.

Then, in advance of explaining the acoustic field environment which the projector 100 according to the present embodiment forms on the periphery, an acoustic field environment which the projector according to a comparative example forms on the periphery will be described.

The configuration of the projector according to the comparative example is different in the layout of the first speaker 51 and the second speaker 52 from the projector 100 according to the present embodiment, and the rest of the configuration is common to both of the projectors. Therefore, in the projector according to the comparative example, members common to the projector 100 according to the present embodiment are denoted by the same reference symbols to omit the description thereof.

Specifically, in the case of the projector according to the comparative example, the first speaker 51 is disposed in the right rear side corner part 27R in the inside of the exterior housing 120 so as to fulfill a relationship of θ1≤45°, and the second speaker 52 is disposed in the left rear side corner part 27L in the inside of the exterior housing 120 so as to fulfill a relationship of θ2≤45°.

Figure 2:
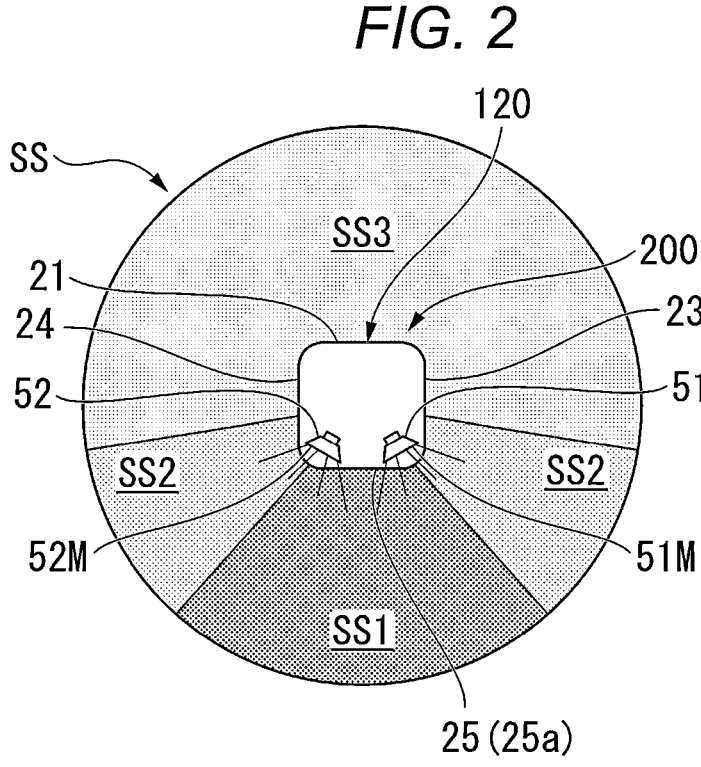
FIG. 2 is a diagram showing an acoustic field environment which a projector according to a comparative example forms on the periphery.
Figure 2:
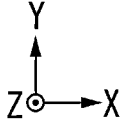

FIG. 2 is a diagram showing an acoustic field environment which the projector according to the comparative example forms on the periphery. FIG. 2 is a diagram showing an acoustic field environment when using the projector according to the comparative example in a state in which the rear side wall part 25 is at a distance from a wall. It should be noted that FIG. 2 is a plan view of an installation space of the projector viewed from the +Z side as an upper side toward the −Z side as a lower side.

As shown in FIG. 2, an acoustic field environment SS formed by a projector 200 according to the comparative example includes a first area SS1, a pair of second areas SS2, and a third area SS3.

In the projector 200 according to the comparative example, since the respective output surfaces 51M, 52M of the first speaker 51 and the second speaker 52 and the outer surface 25a of the rear side wall part 25 are disposed at an angle no larger than 45 degrees, the sound is concentrated in the −Y direction as the rear side in the front-back direction Y of the projector 200. Since the middle/high pitch sounds emitted from the first speaker 51 and the second speaker 52 are each a sound wave high in directionality, the sounds of the first speaker 51 and the second speaker 52 are difficult to spread in the +Y direction as the front side of the projector 200.

Therefore, in the first area SS1 located at the −Y direction side as the rear side of the projector 200, since the middle/high pitch sounds from the first speaker 51 and the second speaker 52 overlap each other, it is possible to obtain the highest quality sound.

Further, in the second area SS2 located diagonally backward right of the projector 200 as one of the second areas SS2, it is possible to obtain a high quality sound including mainly the middle/high pitch sound from the first speaker 51. Further, in the second area SS2 located diagonally backward left of the projector 100 as the other of the second areas SS2, it is possible to obtain a high quality sound including mainly the middle/high pitch sound from the second speaker 52.

Since the sounds from the first speaker 51 and the second speaker 52 are difficult to spread frontward, it is unachievable to obtain the high quality sound in the third area SS3 wide in range including the left side, the right side, and the front side of the projector 200.

The third area SS3 the lowest in sound quality occupies more than half of the acoustic field environment SS which the projector 200 according to the comparative example forms on the periphery. Therefore, in order to perform viewing of an image giving greater importance to the sound quality in the projector 200 according to the comparative example, it is necessary to be located in the first area SS1 or the second areas SS2 at the −Y direction side as the rear side of the projector 200, and there is a problem that the use of the space is limited. Further, when using the projector 200 according to the comparative example in a narrow space, since a surrounding space of the projector 200 is further limited, the problem described above becomes more conspicuous.

In contrast, in the projector 100 according to the present embodiment, since the respective output surfaces 51M, 52M of the first speaker 51 and the second speaker 52 and the outer surface 25a of the rear side wall part 25 are tilted in the angle range larger than 45 degrees and smaller than 90 degrees as described above, it is possible to form the acoustic field environment high in quality on the periphery.

The acoustic field environment which the projector 100 according to the present embodiment forms on the periphery will hereinafter be described.

Figure 3:
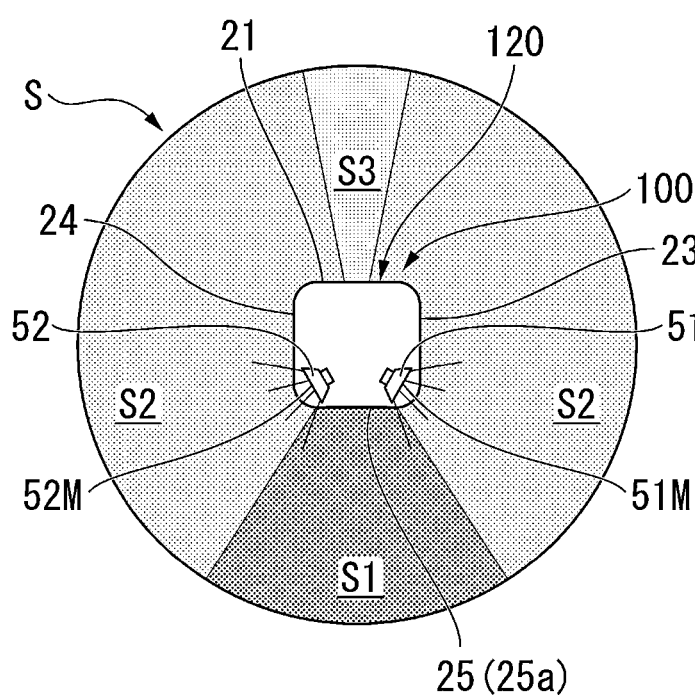
FIG. 3 is a diagram showing an acoustic field environment of the projector used in a state in which the projector is at a distance from a wall.
Figure 3:
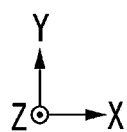
Figures 4, 5:
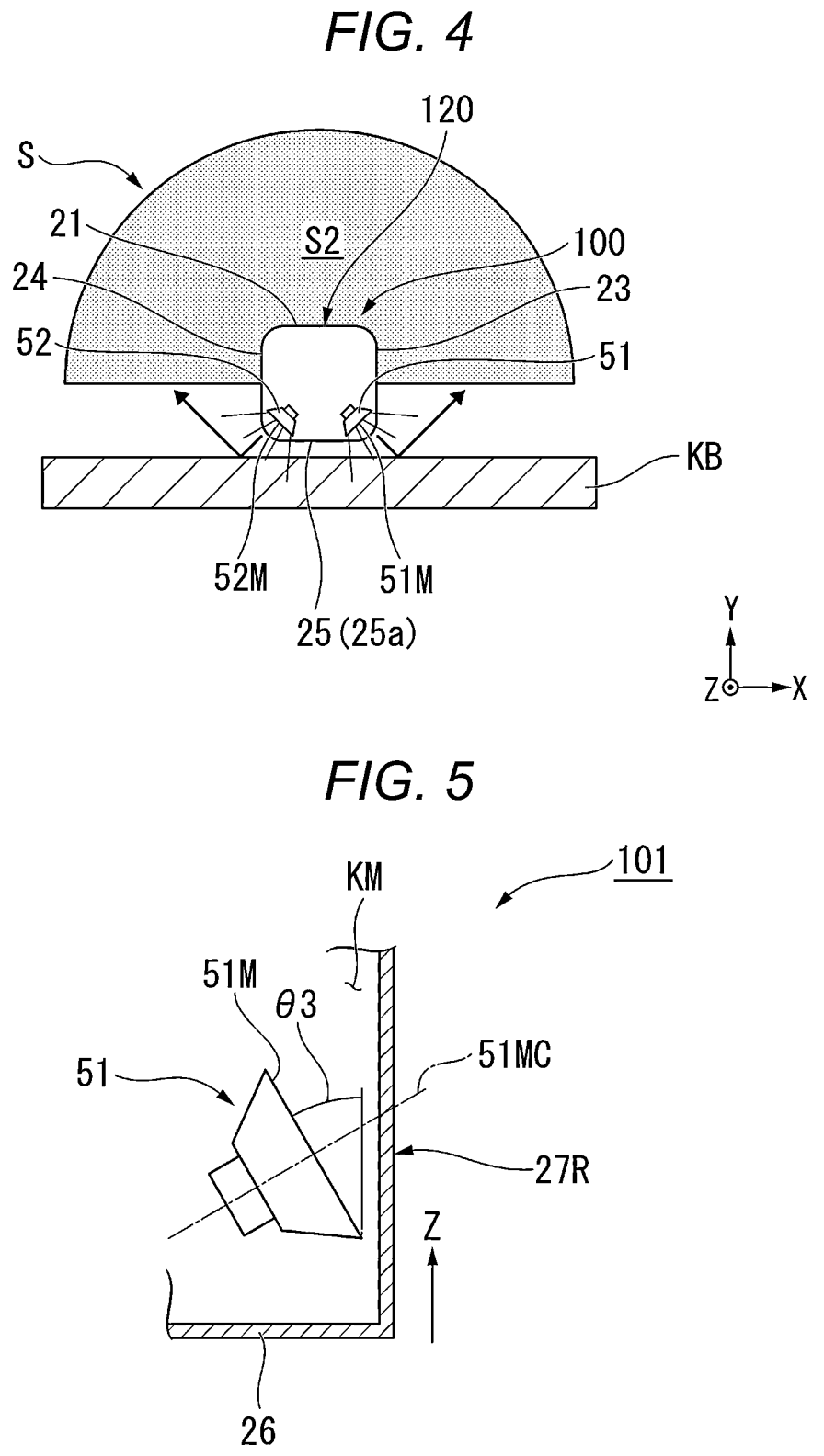

FIG. 3 and FIG. 4 are diagrams showing the acoustic field environment which the projector 100 according to the present embodiment forms on the periphery. FIG. 3 is a diagram showing the acoustic field environment when using the projector 100 in a state in which the rear side wall part 25 is at a distance from a wall. FIG. 4 is a diagram showing the acoustic field environment when using the projector 100 in a state in which the rear side wall part 25 is close to the wall. It should be noted that FIG. 3 and FIG. 4 are each a plan view of the installation space of the projector 100 viewed from the +Z side as the upper side toward the −Z side as the lower side.

As shown in FIG. 3, an acoustic field environment S formed by the projector 100 according to the present embodiment includes a first area S1, a pair of second areas S2, and a third area S3.

In the projector 100 according to the present embodiment, since the respective output surfaces 51M, 52M of the first speaker 51 and the second speaker 52 are disposed in an angle range larger than 45 degrees and smaller than 90 degrees with respect to the outer surface 25a of the rear side wall part 25, a sound is apt to spread to the entire circumference of the projector compared to the projector 200 according to the comparative example.

In the first area S1 located at the −Y direction side as the rear side of the projector 100 according to the present embodiment, since the middle/high pitch sounds from the first speaker 51 and the second speaker 52 overlap each other, it is possible to obtain a high quality sound.

In the case of the projector 100 according to the present embodiment, the respective output surfaces 51M, 52M of the first speaker 51 and the second speaker 52 are disposed to face rather the right side wall part 23 side or the left side wall part 24 side than the rear side wall part 25 side. Therefore, the range of the first area S1 becomes narrower than the range of the first area SS1 of the projector 200 according to the comparative example.

On the other hand, since the output surface 51M is disposed to face rather the right side wall part 23 side than the rear side wall part 25 side, the range of the second area S2 located at the right side of the projector 100 as one of the second areas S2 spreads from the diagonally backward right side to a part of the diagonally forward right side of the projector 100. It should be noted that in the one of the second areas S2, it is possible to obtain the high quality sound including mainly the middle/high pitch sound from the first speaker 51.

Further, since the output surface 51M is disposed to face rather the left side wall part 24 side than the rear side wall part 25 side, the range of the second area S2 located at the left side of the projector 100 as the other of the second areas S2 spreads from the diagonally backward left side to a part of the diagonally forward left side of the projector 100. It should be noted that in the other of the second areas S2, it is possible to obtain the high quality sound including mainly the middle/high pitch sound from the second speaker 52.

As described above, according to the projector 100 related to the present embodiment, it is possible to expand the range of the second area S2 to be larger than the range of the second area SS2 in the projector 200 according to the comparative example.

Even in the projector 100 according to the present embodiment, in the third area S3 located at the front side where the sounds from the first speaker 51 and the second speaker 52 are difficult to transfer, it is unachievable to obtain the high quality sound. However, according to the projector 100 related to the present embodiment, it is possible to make the range of the third area S3 sufficiently narrower than the range of the third area SS3 in the projector 200 according to the comparative example.

In other words, according to the projector 100 related to the present embodiment, it is possible to make the viewing audience view the image with the higher sound quality in a wide range on the periphery of the projector compared to the projector 200 according to the comparative example.

Further, for example, when using the projector 100 according to the present embodiment in a relatively narrow space, there is created the state in which the rear side wall part 25 of the exterior housing 120 is close to the wall. In such a usage aspect, as shown in FIG. 4, the projector 100 according to the present embodiment is capable of forming the acoustic field environment S formed of the second areas S2 in a wide range in which the high sound quality is obtained from the right and left side surfaces to the front side by the sounds of the respective speakers 51, 52 reflected by the wall KB close to the rear side wall part 25 wrapping around the exterior housing 120 to the front side although the high sound quality area in which the sounds of the first speaker 51 and the second speaker 52 overlap each other vanishes.

In contrast, when using the projector 200 according to the comparative example in a relatively narrow space, since the output surfaces 51M, 52M of the respective speakers 51, 52 face the wall part side, the sound reflected by the wall part is difficult to wrap around the exterior housing 120 to the front side, and it is unachievable to form such an acoustic field environment as in the projector 100 according to the present embodiment.

As described above, the projector 100 according to present embodiment includes the exterior housing 120 having the front side wall part 21 facing the screen SCR on which the image is projected, the rear side wall part 25 facing the opposite side to the front side wall part 21 in the front-back direction Y along the Y axis, the right side wall part 23 and the left side wall part 24 facing respective sides opposite to each other in the horizontal direction X along the X axis perpendicular to the Y axis, and the top wall part 22 and the bottom wall part 26 facing respective sides opposite to each other in a direction along the Z axis perpendicular to the X axis and the Y axis, the first speaker 51 disposed in the right rear side corner part 27R formed of the rear side wall part 25 and the right side wall part 23 in the inside of the exterior housing 120, and the second speaker 52 disposed in the left rear side corner part 27L formed of the rear side wall part 25 and the left side wall part 24 in the inside of the exterior housing 120.

The first output surface 51M for outputting the sound wave in the first speaker 51 is tilted toward the right side wall part 23 in the angle range larger than 45 degrees and smaller than 90 degrees with reference to the rear side wall part 25.

The second output surface 52M for outputting the sound wave in the second speaker 52 is tilted toward the left side wall part 24 in the angle range larger than 45 degrees and smaller than 90 degrees with reference to the rear side wall part 25.

According to the projector 100 related to the present embodiment, since the respective output surfaces 51M, 52M of the first speaker 51 and the second speaker 52 are disposed in an angle range larger than 45 degrees and smaller than 90 degrees with respect to the outer surface 25a of the rear side wall part 25, it is possible to form the acoustic field environment high in quality throughout a broad range on the periphery of the projector 100.

Further, the projector 100 according to the present embodiment is capable of forming the acoustic field environment of obtaining the high sound quality in a broad range on the periphery by the sounds of the speakers 51, 52 provided in the angle range described above being reflected by the wall close to the rear side wall part 25 in good condition even when using the projector 100 in a relatively narrow space.

Therefore, the projector 100 according to the present embodiment is capable of realizing the projector which enables the image viewing with the high sound quality in a broad range.

It should be noted that the scope of the present disclosure is not limited to the embodiment described above, and a variety of modifications can be provided thereto within the scope or the spirit of the present disclosure.

Besides the above, the specific descriptions of the shape, the number, the arrangement, the material, and so on of the elements of each of the speakers and the projector are not limited to those in the embodiment described above, and can freely be modified. Although in the embodiment described above, there is described when the projector according to the present disclosure is applied to the projector using the liquid crystal light valves as an example, this is not a limitation. The projector according to the present disclosure can also be applied to a configuration using digital micromirror devices as the light modulation devices. Further, the projector is not required to have a plurality of light modulation devices, and can be provided with just one light modulation device.

Although there is cited when the third speaker 53 is disposed so that the third output surface 53M face the bottom wall part 26 as an example in the present embodiment, it is possible to dispose the third speaker 53 so that the third output surface 53M faces the rear side wall part 25 or the top wall part 22. Further, it is possible to install a plurality of the third speakers, and dispose the third output surfaces of the third speakers so as to respectively face the bottom wall part 26, the rear side wall part 25, and the top wall part 22.

Further, a positional relationship in the vertical direction Z between the projector installation surface on which the projector 100 is provided and the viewing audience is not considered in the embodiment described above, but the projector installation surface on which the projector is provided is generally disposed at a position lower than that of the viewing audience. When the projector installation surface is lower in height than the viewing audience as described above, it is necessary to install the projector on the projector installation surface in a state in which the projector is tilted up so as to make the direction in which the image is projected face upward. For example, when installing the projector 100 according to the embodiment described above in a state of being tilted upward, there is created the state in which the top wall part 22 of the exterior housing 120 faces the viewing audience side.

As described above, the middle/high pitch sounds emitted from the first speaker 51 and the second speaker 52 are each a sound wave high in directionality. Therefore, it is desirable to set the speakers 51, 52 in a state in which the output surfaces 51M, 52M for outputting the sound wave high in directionality face the viewing audience side.

First Modified Example

A configuration of an essential part of the projector which allows the viewing audience to view an image with a high sound quality even when installing the projector on the projector installation surface in the tilt-up state will hereinafter be described as a first modified example. It should be noted that elements common to the embodiment described above will be denoted by the same reference symbols to omit the detailed description thereof.

FIG. 5 is a configuration diagram of an essential part of the projector according to the first modified example.

As shown in FIG. 5, in a projector 101 according to the present modified example, the first output surface 51M of the first speaker 51 is tilted toward the top wall part 22 with respect to the rear side wall part 25 and the right side wall part 23 opposed to the first output surface 51M. Here, a virtual plane including the Z axis and a center 51MC of the first output surface 51M is referred to as a first virtual plane KM.

As shown in FIG. 5, in the projector 101 according to the present modified example, the first output surface 51M of the first speaker 51 is tilted in an angle range larger than 5 degrees and up to 45 degrees toward an upper side as the top wall part 22 side in a cross-sectional view in the first virtual plane KM. Here, an angle between the first output surface 51M and the Z axis is defined as θ3. On this occasion, the first speaker 51 is disposed in the right rear side corner part 27R in the inside of the exterior housing 120 so as to fulfill a relationship of $5°<θ3≤45°$. It is preferable for this tilt angle to fulfill $10°<θ3<45°$.

In the case of the present modified example, the first output surface 51M of the first speaker 51 is tilted at 30 degree toward the top wall part 22 in the cross-sectional view in the first virtual plane KM. In other words, the first speaker 51 is disposed in the right rear side corner part 27R in the inside of the exterior housing 120 so as to fulfill a relationship of $θ3=30°$.

Although not shown in the drawings, similarly to the first speaker 51, the second output surface 52M of the second speaker 52 is tilted toward the top wall part 22 with respect to the rear side wall part 25 and the left side wall part 24 opposed to the second output surface 52M. Here, a virtual plane including the Z axis and the center of the second output surface 52M is referred to as a second virtual plane.

In the present modified example, the tilt angle with respect to the Z axis in the second virtual plane on the second output surface 52M of the second speaker 52 is the same as the tilt angle with respect to the Z axis in the first virtual plane KM on the first output surface 51M of the first speaker 51.

In other words, the second output surface 52M of the second speaker 52 is tilted in an angle range larger than 5 degrees and up to 45 degrees toward an upper side as the top wall part 22 side in a cross-sectional view in the second virtual plane. Here, defining an angle between the second output surface 52M and the Z axis as θ4, the second speaker 52 is disposed in the left rear side corner part 27L in the inside of the exterior housing 120 so as to fulfill a relationship of $5°<θ4≤45°$. It is preferable for this tilt angle to fulfill $10°<θ4<45°$.

The second output surface 52M of the second speaker 52 is tilted at 30 degrees toward the top wall part 22 in the cross-sectional view in the second virtual plane. In other words, the second speaker 52 is disposed in the left rear side corner part 27L in the inside of the exterior housing 120 so as to fulfill a relationship of $θ4=30°$.

As described above, according to the projector 101 related to the present modified example, in the state in which the projector 101 is installed in the projector installation surface, the respective output surfaces 51M, 52M of the first speaker 51 and the second speaker 52 are tilted so as to face upward.

According to the projector 101 related to the present modified example, by arranging the output surfaces 51M, 52M of the respective speakers 51, 52 so as to tilt toward the top wall part 22, it is possible to make it easy to train the output surfaces 51M, 52M of the respective speakers 51, 52 toward the viewing audience even when installing the projector 101 in the state of tilting upward as described above. Therefore, it is possible to output high quality sounds from the output surfaces 51M, 52M of the respective speakers 51, 52 toward the viewing audience.

It should be noted that in the projector 101 according to the present modified example, since the output surfaces 51M, 52M of the respective speakers 51, 52 and the top wall part 22 are opposed to each other, it is possible to arrange that openings are formed in areas in the top wall part 22 opposed respectively to the output surfaces 51M, 52M, and the middle/high pitch sounds emitted from the respective output surfaces 51M, 52M are taken out to the outside of the exterior housing 120 through the openings of the top wall part 22.

Second Modified Example

Another configuration of the exterior housing will hereinafter be described as a second modified example. It should be noted that elements common to the embodiment described above will be denoted by the same reference symbols to omit the detailed description thereof.

Figure 6:
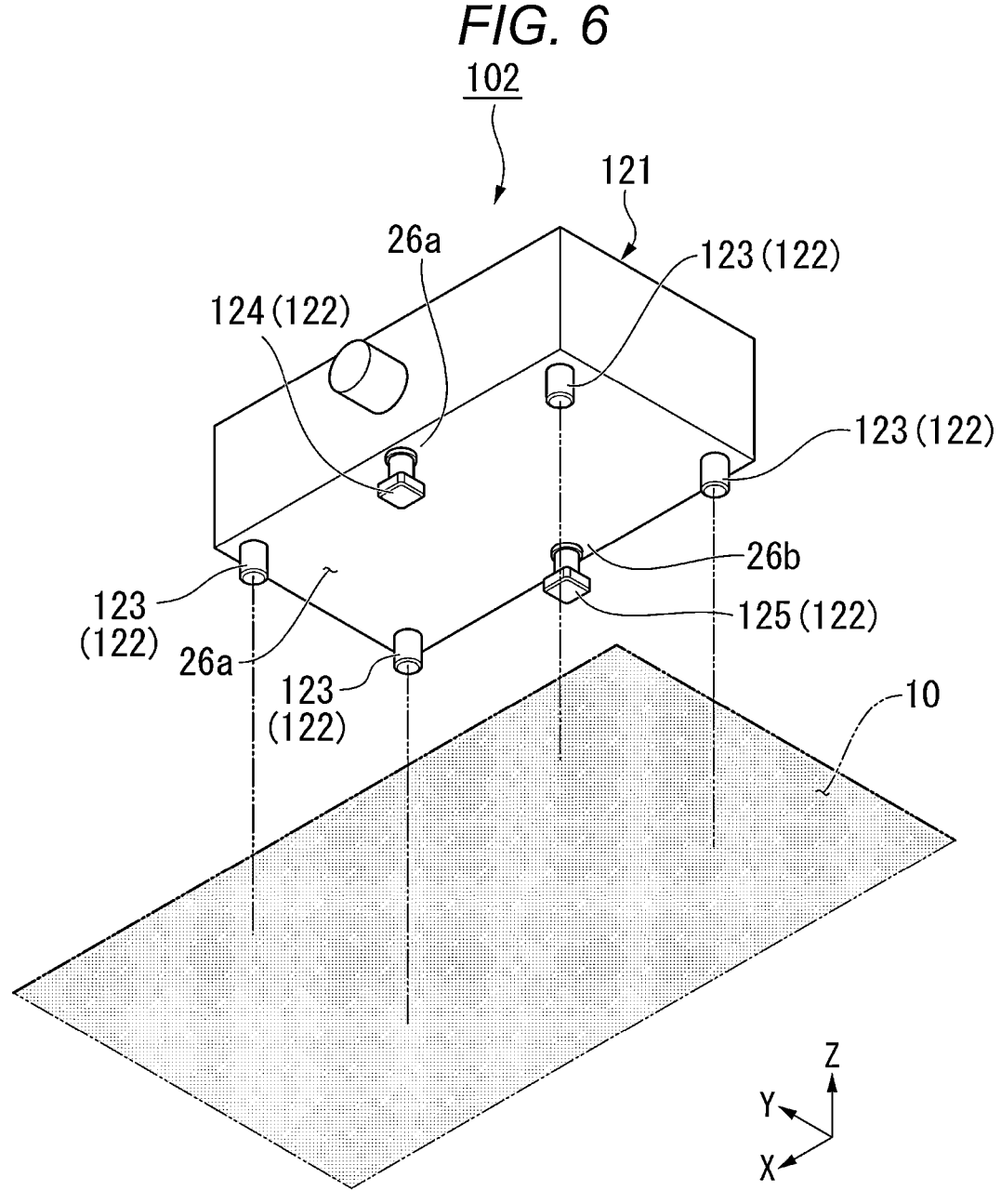
FIG. 6 is a schematic configuration diagram of a projector according to a second modified example.

FIG. 6 is a schematic configuration diagram of a projector according to the second modified example. FIG. 6 is a perspective view of the projector viewed from a lower side toward the upper side.

As shown in FIG. 6, a projector 102 according to the present modified example has leg parts 122 for tilting an exterior housing 121 with respect to a table-top surface 10 as the projector installation surface. The leg parts 122 are disposed in the bottom wall part 26 of the exterior housing 121, the bottom wall part 26 being opposed to the table-top surface 10.

The leg parts 122 include four stationary legs 123, a front movable leg 124, and a rear movable leg 125. The stationary legs 123 are the leg parts which are disposed on the four corners of the bottom wall part 26, and which stably hold the exterior housing 121 on the table-top surface 10. The front movable leg 124 is the leg part which is disposed in a front end part 26a adjacent to the front side wall part 21 out of the bottom wall part 26, and which can extend and contract in the vertical direction Z. The rear movable leg 125 is the leg part which is disposed in a rear end part 26b adjacent to the rear side wall part 25 out of the bottom wall part 26, and which can extend and contract in the vertical direction Z. It should be noted that the rear movable leg 125 is made capable of extending and contracting independently of the front movable leg 124. The front movable leg 124 and the rear movable leg 125 can adopt either of an electric driving method and a manual driving method.

For example, in the leg parts 122, when extending the front movable leg 124, the front end part 26a of the bottom wall part 26 of the exterior housing 121 lifts toward the +Z direction as the upper side of the table-top surface 10, and at the same time, the rear end part 26b of the bottom wall part 26 of the exterior housing 121 becomes in the state of having contact with the table-top surface 10 via a pair of the stationary legs 123. In other words, the leg parts 122 can be set in the state of tilting the front side in the +Y direction of the projector 102 toward the +Z direction as the upper side with respect to the table-top surface 10 by extending the front movable leg 124.

On the other hand, in the leg parts 122, when extending the rear movable leg 125, the rear end part 26b of the bottom wall part 26 of the exterior housing 121 lifts toward the +Z direction as the upper side of the table-top surface 10, and at the same time, the front end part 26a of the bottom wall part 26 of the exterior housing 121 becomes in the state of having contact with the table-top surface 10 via a pair of the stationary legs 123. In other words, the leg parts 122 can be set in the state of tilting the front side in the +Y direction of the projector 101 toward the −Z direction as the lower side with respect to the table-top surface 10 by extending the rear movable leg 125.

According to the projector 102 related to the present modified example, it is possible to change a holding posture of the exterior housing 121 with respect to the table-top surface 10 with the leg parts 122 provided to the exterior housing 121. Therefore, it is possible to install the projector 102 according to the present modified example on the projector installation surface in, for example, an upward projection posture for projecting an image toward a screen located at the upper side and a downward projection posture for projecting an image toward a screen located at the lower side.

Therefore, according to the projector 102 related to the present modified example, it is possible to provide a projector which suppresses a limitation in a height relationship between the screen and the table-top surface 10 as the projector installation surface, and which is therefore excellent in general versatility.

Third Modified Example

A configuration further provided with another speaker in addition to the speaker device 150 will hereinafter be described as a third modified example. It should be noted that elements common to the embodiment described above will be denoted by the same reference symbols to omit the detailed description thereof.

Figure 7:
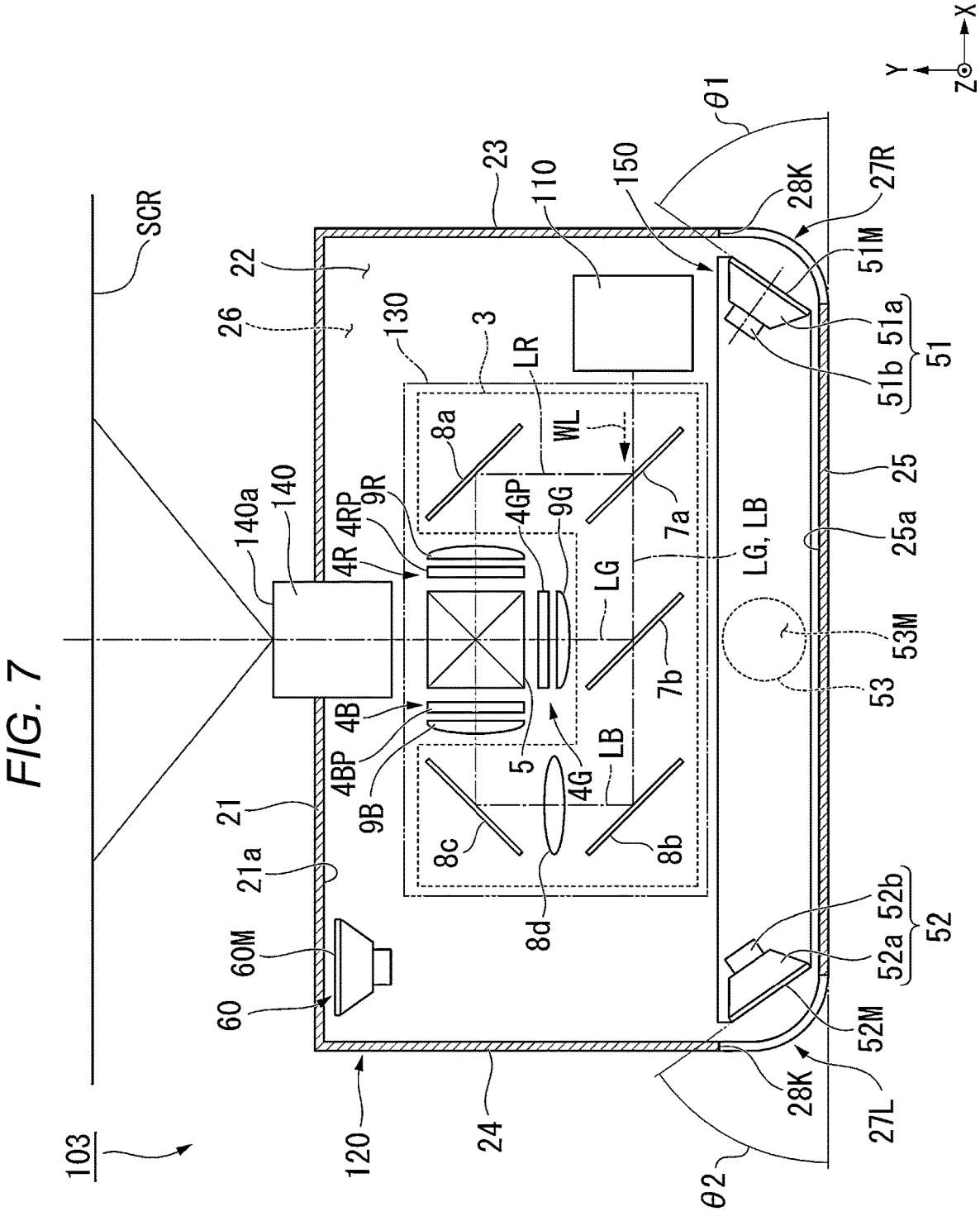
FIG. 7 is a schematic configuration diagram of a projector according to a third modified example.

FIG. 7 is a schematic configuration diagram of a projector according to the third modified example.

As shown in FIG. 7, a projector 103 according to the present modified example is provided with the illumination unit 110, the exterior housing 120, the image forming unit 130, the projection optical device 140, the speaker device 150, and a fourth speaker 60.

The fourth speaker 60 is a bass speaker for emitting a bass sound wave lower than those of the first speaker 51 and the second speaker 52. The fourth speaker 60 has substantially the same configuration as that of the third speaker 53, and therefore, the description of the details of the configuration of the fourth speaker 60 will be omitted. The fourth speaker 60 includes a fourth output surface 60M for outputting a bass sound wave.

The fourth speaker 60 in the present modified example is disposed so as to be opposed to an inner surface 21a of the front side wall part 21. Therefore, the fourth speaker 60 is disposed in the exterior housing 120 so as to make the fourth output surface 60M face the inner surface 21a of the front side wall part 21. Since the directionality in the bass sound wave emitted from the fourth speaker 60 is low, the bass sound wave is emitted toward all directions inside the exterior housing 120 to thereby carry to the ears of the viewing audience via the openings 28K.

It should be noted that it is possible to arrange that an opening is formed in the front side wall part 21 opposed to the fourth output surface 60M of the fourth speaker 60 to take out the bass sound emitted from the fourth output surface 60M to the outside of the exterior housing 120 through the opening of the front side wall part 21.

According to the projector 103 related to the present modified example, by further providing the fourth speaker 60 for emitting the bass sound, it is possible to allow the viewing audience to hear a sound with higher presence.

Although there is cited when arranging the fourth output surface 60M of the speaker 60 so as to face the front side wall part 21 as an example in the projector 103 according to the present modified example, it is possible to dispose the fourth speaker 60 so that the fourth output surface 60M faces the front side wall part 21 side as the front side of the bottom wall part 26, or the front side wall part 21 side as the front side of the top wall part 22. Further, it is possible to install a plurality of the fourth speakers, and arrange the fourth output surfaces of the fourth speakers so as to respectively face the front side wall part 21, the front side of the bottom wall part 26, and the front side of the top wall part 22.

Further, in the projector 103 according to the present modified example, the fourth speaker 60 is disposed in addition to the speaker device 150, but the fourth speaker 60 can be disposed integrally with the speaker device 150. In other words, it is possible for the fourth speaker 60 to have a configuration in which the fourth speaker 60 is incorporated in the speaker housing 55 of the speaker device 150.

Further, although there is cited when the projector is configured with the third speaker 53 as the passive radiator and the fourth speaker 60 as the bass speaker as an example in the embodiment described above and the present modified example, it is possible for the third speaker 53 and the fourth speaker 60 to be configured with bass reflex speakers. The third speaker or the fourth speaker formed of the bass reflex speaker has the third output surface or the fourth output surface formed of an air hole. Therefore, it is possible to arrange that an opening is formed in a portion opposed to the air hole out of any of the wall parts of the exterior housing 120 to more efficiently take out the bass sound emitted from the bass reflex speaker to the outside of the exterior housing 120.

Fourth Modified Example

Another configuration of the projection optical device will hereinafter be described as a fourth modified example. It should be noted that elements common to the embodiment described above will be denoted by the same reference symbols to omit the detailed description thereof.

Figure 8:
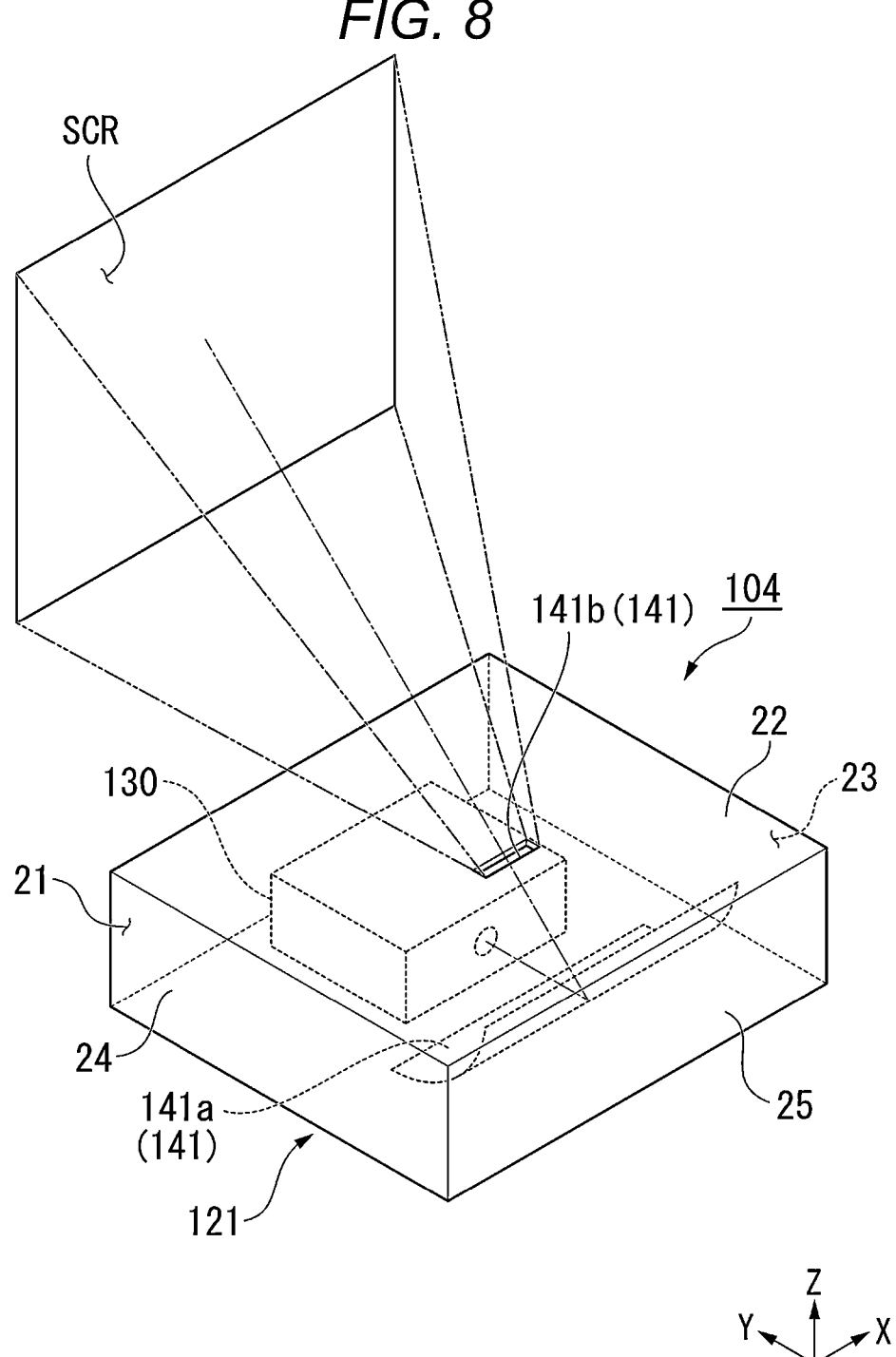
FIG. 8 is a schematic configuration diagram of a projector according to a fourth modified example.

FIG. 8 is a schematic configuration diagram of a projector according to the fourth modified example.

As shown in FIG. 8, in a projector 104 according to the present modified example, a projection optical device 141 includes a reflecting mirror 141a for reflecting light entering the projection optical device 141 from the image forming unit 130 so as to be folded obliquely forward, a projection opening 141b as a light emitting part for emitting the light reflected by the reflecting mirror 141a, and an optical lens not shown.

The projection opening 141b of the projection optical device 141 is disposed in the top wall part 22 of the exterior housing 121. The projection optical device 141 projects an image toward the screen SCR located at the front side wall part 21 side from the projection opening 141*b*.

The projector 103 according to the present modified example is provided with the projection optical device 141 for projecting an image at an obliquely upper side and the front side from the projection opening 141*b* of the top wall part 22, and is therefore capable of realizing an improvement of the sound quality of a single focus projector of projecting an image from a position closer to the screen SCR compared to the projector 100 according to the embodiment described above.

Hereinafter, the conclusion of the present disclosure will supplementarily be noted.

Supplementary Note 1

A projector including an exterior housing having a first wall part facing a projection target surface on which an image is projected, a second wall part facing an opposite side to the first wall part in a direction along a first axis, a third wall part and a fourth wall part facing respective sides opposite to each other in a direction along a second axis perpendicular to the first axis, and a fifth wall part and a sixth wall part facing respective sides opposite to each other in a direction along a third axis perpendicular to the first axis and the second axis, a first speaker disposed in a first corner part configured with the second wall part and the third wall part in an inside of the exterior housing, and a second speaker disposed in a second corner part configured with the second wall part and the fourth wall part in the inside of the exterior housing, wherein a first output surface configured to output a sound wave in the first speaker tilts toward the third wall part in an angle range larger than 45 degrees and smaller than 90 degrees with reference to the second wall part, and a second output surface configured to output a sound wave in the second speaker tilts toward the fourth wall part in an angle range larger than 45 degrees and smaller than 90 degrees with reference to the second wall part.

According to the projector related to Supplementary Note 1, by arranging the respective output surfaces of the first speaker and the second speaker in an angle range larger than 45 degrees and smaller than 90 degrees with respect to the second wall part, it is possible to form the acoustic field environment high in quality throughout a broad range on the periphery of the projector.

Further, the projector is capable of forming the acoustic field environment of obtaining the high sound quality in a broad range on the periphery by the sounds of the speakers installed in the angle range described above being reflected by the wall close to the second wall part in good condition even when using the projector in a relatively narrow space.

Therefore, the projector is capable of realizing the projector which enables the image viewing with the high sound quality in a broad range.

Supplementary Note 2

The projector described in Supplementary Note 1, wherein the first output surface of the first speaker tilts toward the third wall part in an angle range larger than 50 degrees and smaller than 70 degrees with reference to the second wall part, and the second output surface of the second speaker tilts toward the fourth wall part in an angle range larger than 50 degrees and smaller than 70 degrees with reference to the second wall part.

According to the configuration of Supplementary Note 2, since the tilt angles of the respective output surfaces of the first speaker and the second speaker are set in a more appropriate range, it is possible to realize the projector which enables the image viewing with a higher sound quality in a broad range.

Supplementary Note 3

The projector described in Supplementary Note 2, wherein the first output surface of the first speaker tilts toward the third wall part at 60 degrees with reference to the second wall part, and the second output surface of the second speaker tilts toward the fourth wall part at 60 degrees with reference to the second wall part.

According to the configuration of Supplementary Note 3, it is possible to view the image with the high sound quality in a broad range.

Supplementary Note 4

The projector described in any one of Supplementary Note 1 through Supplementary Note 3, wherein the tilt angles of the first speaker and the second speaker are the same as each other.

According to the configuration of Supplementary Note 4, since the sounds of the respective speakers spread in a direction along the second axis in a balanced manner, it is possible to form a homogenous acoustic field environment.

Supplementary Note 5

The projector described in any one of Supplementary Note 1 through Supplementary Note 4 further including a third speaker which is disposed between the first speaker and the second speaker in the direction along the second axis, and which has a third output surface configured to output a sound lower in pitch than those of the first speaker and the second speaker, wherein the third speaker is disposed so that the third output surface faces at least any one of the second wall part, the third wall part, the fourth wall part, and the sixth wall part.

According to the configuration of Supplementary Note 5, by further providing the third speaker for emitting a bass sound, it is possible to allow the viewing audience to hear a sound with higher presence.

Supplementary Note 6

The projector described in any one of Supplementary Note 1 through Supplementary Note 5 further including a fourth speaker having a fourth output surface of outputting a sound wave lower in pitch than those of the first speaker and the second speaker, wherein the fourth speaker is disposed so that the fourth output surface faces at least any one of the first wall part, the first wall part side of the fifth wall part, and the first wall part side of the sixth wall part.

According to the configuration of Supplementary Note 6, by further providing the fourth speaker for emitting a bass sound, it is possible to allow the viewing audience to hear a sound with higher presence.

Supplementary Note 7

The projector described in any one of Supplementary Note 1 through Supplementary Note 6, wherein the first output surface of the first speaker tilts toward the fifth wall part with respect to the second wall part and the third wall part opposed to the first output surface, and the second output surface of the second speaker tilts toward the fifth wall part with respect to the second wall part and the fourth wall part opposed to the second output surface.

According to the configuration of Supplementary Note 7, by the respective output surfaces of the first speaker and the second speaker tilting toward the fifth wall part, it is possible to output a high quality sound from the output surfaces of the respective speakers toward the viewing audience even when, for example, installing the projector in the state of tilting upward.

Supplementary Note 8

The projector described in Supplementary Note 7, wherein the first output surface of the first speaker tilts toward the fifth wall part in an angle range larger than 5 degrees up to 45 degrees in a cross-sectional view in a first virtual plane including the third axis and a center of the first output surface, and the second output surface of the second speaker tilts toward the fifth wall part in an angle range larger than 5 degrees up to 45 degrees with reference to a second virtual plane including the third axis and a center of the second output surface.

According to the configuration of Supplementary Note 8, since the respective output surfaces of the first speaker and the second speaker tilt toward the fifth wall part in an angle range from 10 degrees to 45 degrees, it is possible to make it easy to train the output surfaces of the respective speakers toward the viewing audience even when, for example, installing the projector in the state of tilting upward. Therefore, it is possible to output high quality sounds from the output surfaces of the respective speakers toward the viewing audience.

Supplementary Note 9

The projector described in Supplementary Note 8, wherein the first output surface of the first speaker tilts toward the fifth wall part at 30 degrees in the cross-sectional view on the first virtual plane, and the second output surface of the second speaker tilts toward the fifth wall part at 30 degrees in the cross-sectional view on the second virtual plane.

According to the configuration of Supplementary Note 9, it is possible to efficiently output the high quality sounds from the output surfaces of the respective speakers toward the viewing audience even when, for example, installing the projector in the state of tilting upward.

Supplementary Note 10

The projector described in any one of Supplementary Note 1 through Supplementary Note 9, wherein the exterior housing further has an opening in at least either of the second wall part, the third wall part, and the fourth wall part to which the first output surface of the first speaker or the second output surface of the second speaker is opposed, and the fifth wall part located at a position opposite to the sixth wall part opposed to a projector installation surface.

According to the configuration of Supplementary Note 10, it is possible to efficiently take out the sounds emitted from the first speaker and the second speaker to the outside of the exterior housing through the opening.

Supplementary Note 11

The projector described in any one of Supplementary Note 1 through Supplementary Note 10, wherein the exterior housing further has a leg part which is disposed in the sixth wall part opposed to the projector installation surface, and which tilts the exterior housing with respect to the projector installation surface.

According to the configuration of Supplementary Note 11, it is possible to change the holding posture of the exterior housing with respect to the projector installation surface using the leg part. Therefore, it is possible to provide the projector which suppresses the limitation of the height relationship between the projection target surface and the projector installation surface, and which is excellent in general versatility.

Supplementary Note 12

The projector described in any one of Supplementary Note 1 through Supplementary Note 11 further including a projection optical device configured to project an image on the projection target surface, wherein a throw ratio as a ratio between a distance from the projection optical device to the projection target surface and a width along the second axis of the image is in a range of 0.7 through 1.3.

According to the configuration of Supplementary Note 12, it is possible to realize a good acoustic space in a projector of a type of projecting an image from a position at a certain distance from the projection target surface.

Supplementary Note 13

The projector described in Supplementary Note 12, wherein the throw ratio is in a range of 1.0 through 1.3.

According to the configuration of Supplementary Note 13, it is possible to realize a good acoustic space in a projector for projecting an image from a position at a more moderate distance from the projection target surface.

Supplementary Note 14

The projector described in any one of Supplementary Note 1 through Supplementary Note 13 further including a projection optical device configured to project an image on the projection target surface, wherein a light emitting part of the projection optical device is disposed in the first wall part of the exterior housing.

According to the configuration of Supplementary Note 14, by providing the projection optical device for projecting an image from the light emitting part disposed in the first wall part, it is possible to realize the improvement of the sound quality in the projector of a general focal distance type.

Supplementary Note 15

The projector described in any one of Supplementary Note 1 through Supplementary Note 13 further including a projection optical device configured to project an image on the projection target surface, wherein the light emitting part of the projection optical device is disposed in the fifth wall part of the exterior housing, and projects the image toward the first wall part.

According to the configuration of Supplementary Note 15, by providing the projection optical device for projecting an image from the light emitting part disposed in the fifth wall part toward the first wall part, it is possible to realize the improvement of the sound quality of a single focus projector of projecting an image from a position close to the projection target surface.

What is claimed is:

1. A projector comprising:
an exterior housing having a first wall part facing a projection target surface on which an image is projected, a second wall part facing an opposite side to the first wall part in a direction along a first axis, a third wall part and a fourth wall part facing respective sides opposite to each other in a direction along a second axis perpendicular to the first axis, and a fifth wall part and a sixth wall part facing respective sides opposite to each other in a direction along a third axis perpendicular to the first axis and the second axis;
a first speaker disposed in a first corner part configured with the second wall part and the third wall part in an inside of the exterior housing; and
a second speaker disposed in a second corner part configured with the second wall part and the fourth wall part in the inside of the exterior housing, wherein
a first output surface configured to output a sound wave in the first speaker tilts toward the third wall part in an angle range larger than 45 degrees and smaller than 90 degrees with reference to the second wall part, and
a second output surface configured to output a sound wave in the second speaker tilts toward the fourth wall part in an angle range larger than 45 degrees and smaller than 90 degrees with reference to the second wall part.

2. The projector according to claim 1, wherein
the first output surface of the first speaker tilts toward the third wall part in an angle range larger than 50 degrees and smaller than 70 degrees with reference to the second wall part, and
the second output surface of the second speaker tilts toward the fourth wall part in an angle range larger than 50 degrees and smaller than 70 degrees with reference to the second wall part.

3. The projector according to claim 2, wherein
the first output surface of the first speaker tilts toward the third wall part at 60 degrees with reference to the second wall part, and
the second output surface of the second speaker tilts toward the fourth wall part at 60 degrees with reference to the second wall part.

4. The projector according to claim 1, wherein
the tilt angles of the first speaker and the second speaker are the same as each other.

5. The projector according to claim 1, further comprising:
a third speaker which is disposed between the first speaker and the second speaker in the direction along the second axis, and which has a third output surface configured to output a sound lower in pitch than those of the first speaker and the second speaker, wherein
the third speaker is disposed so that the third output surface faces at least any one of the second wall part, the third wall part, the fourth wall part, and the sixth wall part.

6. The projector according to claim 1, further comprising:
a fourth speaker having a fourth output surface of outputting a sound wave lower in pitch than those of the first speaker and the second speaker, wherein
the fourth speaker is disposed so that the fourth output surface faces at least any one of the first wall part, the first wall part side of the fifth wall part, and the first wall part side of the sixth wall part.

7. The projector according to claim 1, wherein
the first output surface of the first speaker tilts toward the fifth wall part with respect to the second wall part and the third wall part opposed to the first output surface, and
the second output surface of the second speaker tilts toward the fifth wall part with respect to the second wall part and the fourth wall part opposed to the second output surface.

8. The projector according to claim 7, wherein
the first output surface of the first speaker tilts toward the fifth wall part in an angle range larger than 5 degrees up to 45 degrees in a cross-sectional view in a first virtual plane including the third axis and a center of the first output surface, and the second output surface of the second speaker tilts toward the fifth wall part in an angle range larger than 5 degrees up to 45 degrees with reference to a second virtual plane including the third axis and a center of the second output surface.

9. The projector according to claim 8, wherein
the first output surface of the first speaker tilts toward the fifth wall part at 30 degrees in the cross-sectional view on the first virtual plane, and
the second output surface of the second speaker tilts toward the fifth wall part at 30 degrees in the cross-sectional view on the second virtual plane.

10. The projector according to claim 1, wherein
the exterior housing further has an opening in at least either of the second wall part, the third wall part, and the fourth wall part to which the first output surface of the first speaker or the second output surface of the second speaker is opposed, and the fifth wall part located at a position opposite to the sixth wall part opposed to a projector installation surface.

11. The projector according to claim 1, wherein
the exterior housing further has a leg part which is disposed in the sixth wall part opposed to the projector installation surface, and which tilts the exterior housing with respect to the projector installation surface.

12. The projector according to claim 1, further comprising:
a projection optical device configured to project an image on the projection target surface, wherein
a throw ratio as a ratio between a distance from the projection optical device to the projection target surface and a width along the second axis of the image is in a range of 0.7 through 1.3.

13. The projector according to claim 12, wherein
the throw ratio is in a range of 1.0 through 1.3.

14. The projector according to claim 1, further comprising:
a projection optical device configured to project an image on the projection target surface, wherein
a light emitting part of the projection optical device is disposed in the first wall part of the exterior housing.

15. The projector according to claim 1, further comprising:
a projection optical device configured to project an image on the projection target surface, wherein
the light emitting part of the projection optical device is disposed in the fifth wall part of the exterior housing, and projects the image toward the first wall part.

* * * * *